United States Patent [19]

Fölsch et al.

[11] Patent Number: 5,468,800
[45] Date of Patent: Nov. 21, 1995

[54] BINDER WHICH IS CROSSLINKABLE AT ROOM TEMPERATURE

[75] Inventors: Karl J. Fölsch, Mainz; Marita Kaufmann; Jürgen Hartmann, both of Weiterstadt, all of Germany

[73] Assignee: Roehm GmbH Chemische Fabrik, Darmstadt, Germany

[21] Appl. No.: 190,839

[22] Filed: Feb. 3, 1994

[30] Foreign Application Priority Data

Feb. 3, 1993 [DE] Germany .................. 93 01 444.9

[51] Int. Cl.$^6$ ............................................. C08F 2/22
[52] U.S. Cl. .................... 524/458; 524/460; 524/558; 524/566
[58] Field of Search .................... 524/458, 460, 524/558, 560

[56] References Cited

U.S. PATENT DOCUMENTS

| | | |
|---|---|---|
| 4,544,609 | 10/1985 | Hui . |
| 4,605,702 | 8/1986 | Guerro et al. . |
| 4,965,317 | 10/1990 | Kania et al. . |
| 5,021,469 | 6/1991 | Langerbeins et al. ........... 523/201 |
| 5,071,902 | 12/1991 | Langerbeins et al. ........... 524/458 |

FOREIGN PATENT DOCUMENTS

| | | |
|---|---|---|
| 0261878 | 3/1988 | European Pat. Off. . |
| 0384125 | 8/1990 | European Pat. Off. . |

*Primary Examiner*—Jeffrey T. Smith
*Attorney, Agent, or Firm*—Oblon, Spivak, McClelland, Maier & Neustadt

[57] ABSTRACT

Aqueous binders for liquid coating agents which contain a film-forming, aqueous plastic dispersion and a crosslinking component can be stored in ready-to-use form and quickly harden after being processed into a coating, at room temperature or a temperature just slightly above, forming a hard, dry, crosslinkable film. The plastic dispersion is an emulsion polymer with polymerized units of an ethylenically-unsaturated, radically polymerizable monomer with an alkylene urea side group. The crosslinking agent contains at least two, possibly protected, aldehyde groups.

14 Claims, No Drawings

BINDER WHICH IS CROSSLINKABLE AT ROOM TEMPERATURE

BACKGROUND OF THE INVENTION

1. Field of the Invention

The present invention relates to an aqueous binder, which is crosslinkable at room temperature, and its use as a coating agent and for binding solid objects.

2. Discussion of the Background

Paint technology has always used liquid coating agents containing a binder which dries at room temperature. Classic oil-based paints contain binders in the form of drying oils which under the influence of oxygen in the air harden due to the radical polymerization of unsaturated groups in the oil molecules. The evaporation of the solvent and simultaneous crosslinking results in the formation of a hard, dry surface with a high solvent resistance.

For reasons of environmental protection, there is a growing interest in replacing solvent-based coating agents with aqueous-based, solvent-free systems. But the quality of the dried coatings produced with such solvent-free systems does not correspond to that of the classic paints. The aqueous coating agents contain latex-like binders which form a film during drying, but do not crosslink. The obtained coatings are frequently soft and sticky (tacky) and are susceptible to organic solvents.

There has been no lack of attempts to produce aqueous coating agents which harden into hard, dry films while crosslinking. As an example, self-crosslinking plastic dispersions containing emulsion polymers which contain N-methylol groups and possibly additional dissolved aminoplast resins are widely used. But these only harden at increased temperatures and, thus, are called aqueous baking lacquers.

The objective of a binder which crosslinks at room temperature or slightly above is hard to realize, since hardening starts even before film formation during the storage of the crosslinkable coating agent. To circumvent this problem, two-component systems in which binder components able to react at room temperature are mixed only just before forming a coating film so that they are able to harden in the form of a coating film are frequently used. The use of two-component coating agents requires special coating equipment, such as two-component spray guns with accurate metering devices for both components.

EP-A 184 091 describes aqueous binders for paints which are characterized by a low film forming temperature and high block resistance of the formed films. This binder is characterized by a multi-stage emulsion polymer, the first stage of which yields a relatively soft polymer core and the second stage of which yields a significantly harder polymer shell of the latex particles. For the purpose of crosslinking, the emulsion polymer may contain units of unsaturated carbonyl compounds, such as diacetone acrylamide which are reacted with dihydrazides. The adhesion of the coating films on the coated substrates furthermore can be improved if the emulsion polymer also contains units of unsaturated ethylene urea derivatives. Emulsion polymers containing both units of unsaturated carbonyl compounds and units of ethylene urea derivatives have not been described.

Aqueous plastic dispersions containing alkylene urea groups are known. According to EP-A 379 892, these groups are used to improve the adhesion of films formed from the dispersions on solid substrates, or, according to EP-A 384 125, as crosslinking-reactive group and simultaneously as formaldehyde getters in self-crosslinking plastic dispersions containing N-methylolamide groups. But it was not known that alkylene urea groups could be crosslinked by means of aldehyde functional groups.

Thus, there remains a need for aqueous-based, solvent-free binder composition which are crosslinkable at room temperature or temperatures slightly above room temperature.

SUMMARY OF THE INVENTION

Accordingly, it is one object of the present invention to provide novel binders for liquid coating agents which can be stored in ready-to-use form and which quickly harden, after being processed into a coating, at room temperature or a temperature just slightly above room temperature, forming a hard, dry, crosslinkable film.

It is another object of the present invention to provide a hardened, crosslinked coating of such binders.

It is another object of the present invention to provide an article which is coated with a hardened, crosslinked coating of such a binder.

These and other objects which will become apparent during the following detailed description have been achieved by an aqueous binder based on (a) a film-forming, aqueous plastic dispersion, containing an emulsion polymer with polymerized units of an ethylenically-unsaturated, radically polymerizable monomer with an alkylene urea side group, and a crosslinking component containing at least two protected or unprotected aldehyde groups, or (b) a self-crosslinking, film-forming, aqueous plastic dispersion containing an emulsion polymer with polymerized units of an ethylenically-unsaturated, radically polymerizable monomer with an alkylene urea side group and with polymerized units of an ethylenically-unsaturated, radically polymerizable monomer with at least one protected or unprotected aldehyde group and which is dihydrazide-free.

DETAILED DESCRIPTION OF THE PREFERRED EMBODIMENTS

The present invention is based on the finding that in a film formed from the dispersion, the alkylene urea groups of the emulsion polymer react with aldehyde groups, which possibly are protected, at room temperature or slightly increased temperature, while crosslinking, whereas the crosslinking in the liquid dispersion takes place so slowly at room temperature that the appropriately structured binders can be stored for a sufficient length of time.

The alkylene urea groups are able to react both with multi-functional aldehydes acting as crosslinking component and with aldehyde groups of the same polymer. Satisfactory crosslinking is achieved if 1 to 2 moles of a dialdehyde or 1 to 4 moles of polymer-bound aldehyde groups are available per mole of the alkylene urea group. The crosslinking reaction is catalyzed by acid. pH values from 1 to 3 are particularly advantageous, but crosslinking is achieved even with pH values up to 8. The crosslinking proceeds sufficiently fast at temperatures between 20° and 40° C. In most cases, higher crosslinking temperatures result in no or insufficient improvements.

Suitable multi-functional aldehydes are low molecular weight compounds, especially aliphatic dialdehydes with the formula OCH—$(CH_2)_n$—CHO, wherein n stands for an integer of from 0 to 8, preferably 0 to 4, such as glyoxal or glutardialdehyde. It is preferred that multi-functional aldehydes are used which are water-soluble at the crosslinking temperature at least at a concentration of 0.2 mol/l. But it is also possible that oligomers, polymers, or copolymers of ethylenically-unsaturated, radically polymerizable aldehydes are used as a crosslinking component, presupposing that they contain several aldehyde functions per molecule. Suitable ethylenically-unsaturated, radically polymerizable aldehydes are e.g. acrolein and methacrolein. To the extent that they are sufficiently water-soluble, such crosslinking components can be dispersed in the aqueous phase of the dispersion and may take part in the film formation as binder during the use. Oligomeric or polymeric crosslinking components of this type with a weight average molecular weight from 1,000 to 500,000 are preferred.

The term protected aldehyde groups here means appropriate derivatives which exhibit a reactivity comparable to that of the free aldehyde itself. Suitable are e.g. acetals, mercaptals and mercaptoles, dioxolanes and dithiolanes. Acetal or dioxolane groups formed by the reaction of aldehyde groups with alkanols with 1 to 4 carbon atoms in the alkyl residue, or with alkanediols with 2 or 3 carbon atoms in the alkylene residue, are preferred. Examples of unsaturated monomers with protected aldehyde functions are diethoxypropyl acrylate and methacrylate and acryloyl- or methacryloyl-oxopropyl-1,3-dioxolane.

By the term "dihydrazide free" it is meant that at least 95%, preferably at least 99%, of the protected or unprotected aldehyde groups in embodiment (b) have not been reacted with a dihydrazide.

If the crosslinking is based largely on the reaction of polymer-bound aldehyde groups, the latter are preferably bound to the same emulsion polymer as the alkylene urea groups. In this case, it can be assumed that even prior to the film formation, crosslinking occurs inside the individual latex particles during storage at room temperature. But it has been found that a sufficient crosslinking capacity which can be explained by reactive groups at the particle surface is preserved.

The units of an ethylenically-unsaturated, radically polymerizable monomer with an alkylene urea side group usually account for 1 to 20 wt. %, preferably 2 to 10 wt. %, of the emulsion polymer. Suitable monomers are e.g. N-(2-acryloyloxyethyl)- or (2-methacryloyloxyethyl)-ethylene urea, N-(acrylamido-methylene)- or N-(methacrylamidomethylene)ethylene urea, N-vinyl-ethylene urea, N-vinyloxyethyl-ethylene urea, N-(β-acrylamidoethyl)-ethylene urea, N-(β-methacrylamidoethyl)-ethylene urea, N-[β-acryloyloxyacetamido)-ethyl]-ethylene urea.

The aqueous plastic dispersion can be prepared according to standard methods of emulsion polymerization. They are based on the radical polymerization of ethylenically-unsaturated, radically polymerizable monomers or monomer mixtures, which individually or in their entirety are water-soluble only to a limited extent, so that an aqueous emulsion can be prepared from them in the presence of water-soluble emulsifiers. The polymerization, with its accompanying formation of an aqueous plastic dispersion, is brought about by the action of radical-forming initiators which, as a rule, are present in dissolved form in the aqueous phase and which, on heating to 50° to 100° C. or under the action of reducing agents, form initiation radicals. It is preferred that the inflow process, wherein the monomers as such or in the form of an aqueous emulsion are added to a water phase containing emulsifier and initiator according to the conversion requirement, is used. In general, a solid content of 30 to 65 wt. % and a viscosity not to exceed 10,000 mPa for the final emulsion is desired.

A film formation temperature between approximately 20° to 40° C., preferably 20° to 30° C. is desirable for the use of the plastic dispersion of the invention as a binder. To ensure drying of the dispersion at such temperatures while forming a closed film, the composition of the emulsion polymer is chosen in a known manner so that its dynamic softening temperature (T-lambda-max value according to DIN 53 445) ranges from −20° to 20° C. The minimum film formation temperature is preferably between 0° and 25° C.

The softening and film formation temperature of an emulsion polymer may be set to the desired value in a known manner by choosing the type and amount of principal monomer. Principal monomers are frequently mixtures of hardening and softening monomers in addition to a smaller part of functional monomers. Typical hardening monomers are methyl-, ethyl-, propyl-, isopropyl-, isobutyl-, or cyclohexyl methacrylate, styrene, vinyl toluene, vinyl chloride, and acrylo- and methacrylonitrile. Typical softening monomers are the alkyl esters of acrylic acid with 1 to 12 carbon atoms in the alkyl residue, alkyl esters of methacrylic acid with 4 to 12 carbon atoms in the alkyl residue, ethylene, butadiene, vinyl acetate, and vinylidene chloride. In many cases, a content of 20 to 60 wt. % of hardening and of 40 to 80 wt. % of softening monomers is suitable. A mixture of lower alkyl esters of acrylic and/or methacrylic acid, particularly with 1 to 4 carbon atoms in the alkyl residue, is especially preferred.

In embodiment (b) referred to above, it is to be understood that the amount of ethylenically-unsaturated, radically polymerizable monomer with at least one protected or unprotected aldehyde group used in the emulsion polymerization will depend on the amount of ethylenically-unsaturated, radically polymerizable monomer with an alkylene urea side group used. However, good results have been achieved when the ethylenically-unsaturated, radically polymerizable monomer with at least one protected or unprotected aldehyde group accounts for 0.5 to 20 wt. %, preferably 1 to 10 wt. %, of the total monomer mixture.

In addition to the principal monomers mentioned above, functional comonomers are used. These include primarily the unsaturated alkylene urea derivatives and possibly unsaturated aldehydes as components of the crosslinking system. It is preferred that other actively crosslinking monomers which react above or below the crosslinking temperature which is desirable according to the invention are absent. To improve the stability of the dispersion, small amounts, preferably 0.1 to 5 wt. % of ethylene-unsaturated, radically polymerizable carboxylic acids, such as acrylic and/or methacrylic acid, maleic, fumaric, or itaconic acid also can be additionally used. It is also possible to additionally use small amounts of crosslinking comonomers with two or more ethylene-unsaturated, radically polymerizable groups, whereby the film formation capacity must not be negatively affected.

It is known that different properties of the plastic dispersions and films produced thereof depend on the incorporation of certain functional monomers and on particle size, particle size distribution (uni- or bimodal), of the sequence of monomer addition, the type and amount of emulsifier, pH value, electrolyte content, and other factors. To achieve optimum film properties during the processing of the binders of the invention, it is presupposed that these findings are taken into account in an appropriate manner during the production and use of the invented plastic dispersions, even to the extent not expressly mentioned here.

To ensure good long term storage at ambient temperatures, it is preferred that the aqueous dispersion contain less than 15 wt. %, more preferably less than 10 wt. %, of the crosslinking component containing at least two protected or unprotected aldehyde groups and less than 15 wt. %, more preferably less than 10 wt. %, of the emulsion polymer with polymerized units of an ethylenically-unsaturated, radically polymerizable monomer having an alkylene urea side group, in the case of embodiment (a). To ensure good long term storage at ambient temperatures in the case of embodiment (b), it is preferred that the aqueous dispersion contain less than 20 wt. %, more preferably less than 15 wt. %, of the emulsion polymer having polymerized units of an ethylenically-unsaturated, radically polymerizable monomer with an alkylene urea side group and polymerized units of an ethylenically-unsaturated, radically polymerizable monomer with at least one protected or unprotected aldehyde group which is dihydrazide free.

The emulsion polymer possibly may be produced in several stages, whereby the actively crosslinking monomers are for the most part or entirely added in the last polymerization stage, so that a shell which is able to crosslink with itself or with other latex particles is created above a non-crosslinked core or a core that was otherwise crosslinked.

The plastic dispersions of the invention also can be used, like known crosslinkable or self-crosslinkable plastic dispersions, as binders for solids. Possible solids here are the pigments and fillers commonly used in paints, coating masses, synthetic resin plaster, etc. Suitably, the pigment or filler is present in an amount of 10 to 80 wt. %, preferably 20 to 60 wt. %, based on the total weight of the binder composition. They are mixed with the binder and applied to the substrate to be coated. During drying, a coating is produced, which depending on the existing temperature crosslinks in several hours or days and hereby achieves a hardness and block resistance fulfilling practical requirements, as well as a resistance against organic solvents. The production of coatings and their hardening at low temperatures constitutes the preferred field of application of this invention. This application is also promoted by the adhesion-improving effect of the alkylene urea group.

A further field of application is the strengthening of absorbable papers, cardboard, fiber fleece (non wovens) or fabrics. For this purpose, the binder can be dyed, thickened or foamed as desired and may be applied by saturation, spreading, slopping or spraying onto or into the substrate to be strengthened. Suitable binder coatings range, e.g. from 5 to 100 wt. % (calculated as the dry weight of the binder, based on the dry weight of the substrate).

Where heating is not possible or is uneconomical, the crosslinking may take place at room temperature or possibly at temperatures from 10° C. on up. To accelerate drying and hardening, heating to temperature from 25° to 60° C. may take place. This constitutes a significant simplification and energy savings compared to the usual hardening temperatures of 100° to 150° C. in the past.

Other features of the invention will become apparent in the course of the following descriptions of exemplary embodiments which are given for illustration of the invention and are not intended to be limiting thereof.

EXAMPLES

The effect of the crosslinking system of the present invention on the properties of a film prepared by drying of a dispersion coat at 40° C. over 24 hours is presented in comparison with a known self-crosslinking plastic dispersion on the basis of an emulsion polymer of methylmethacrylate, n-butylacrylate, and a small amount of methacrylic acid. The known plastic dispersion contains a crosslinking system of methylolated methacrylamide. In the examples according to the present invention, it was replaced with N-(methacryloyloxyethyl)-ethylene urea (MEEH) or its combination with acrolein (ACR) or with diethoxypropylmethacrylate (DEOPMA), while the composition of principal monomers remained unchanged.

A. Emulsion polymerization

In a 2 liter-reaction vessel with reflux condensor, stirrer, and feed vessel, 0.54 g of ammonium peroxodisulfate and 0.27 g of an emulsifier are dissolved in 430 g of water, and the solution is heated to 80° C. The emulsifier is a tri-isobutyl-phenol which was reacted with 7 times the molar amount of ethylene oxide and was sulfated and neutralized with sodium hydroxide solution.

With stirring, an emulsion of 396 g of n-butylacrylate, 292 g of methylmethacrylate, 36 g of N-(2-methacryloyloxyethyl)ethylene urea, 3.6 g of methacrylic acid, 8 g of the emulsifier, and 665 g of water are metered in evenly over 4 hours. This mixture is then stirred for 30 minutes at 80° C. and is cooled to room temperature. 0.3 g of 1,4-diisopropylbenzene-monohydroperoxide and 0.5 g of Na-hydroxymethylsulfinate are added as redox initiator in order to polymerize the remaining monomers.

The obtained 40% by weight solids dispersion is filtered. It has a pH value of 2.2. The mean particle diameter (Nanosizer value) is 136 nm.

The other dispersions for the tests described under B are prepared analogously.

B. Film production and testing

The 40% by weight solids plastic dispersion to be tested is, as shown in the table below, mixed with glyoxal (GLY) or glutardialdehyde (GAL) as a crosslinking component in the given molecular ratio (Mol MEEH: Mol $CH_2O$ groups) and stirred for 1 hour. In some batches, the pH value was modified with ammonia or toluene-p-sulfonic acid prior to the addition of the crosslinking component.

With a spatula an approximately 0.1 mm thick layer of the plastic dispersion was spread over a Teflon-coated glass plate and was dried over night in a drying oven at 40° C., resulting in a clear film.

The film is then pulled off the glass plate. For comparison, another film is dried for 15 minutes at 140° C.

To test the crosslinking, a 10 $cm^2$ film piece is caused to swell for 24 hours at room temperature in tetrahydrofuran. After it is removed, the free fluid is blotted off and the increase in weight is measured. Following evaporation of the absorbed tetrahydrofuran, the weight loss attributable to non-crosslinked, soluble polymer parts is determined. Only those samples are considered in which the weight loss is below 1 wt. %. Swelling values below 250% indicate satisfactory, below 200% good crosslinking.

| Tested dispersion | pH | Swelling values in % 40° C. | Swelling values in % 140° C. |
| --- | --- | --- | --- |
| Control dispersion with methyloylamide crosslinking | 3.0 | 410 | 216 |
| Dispersions of Present Invention | | | |
| 5 wt. % MEEH + Glyoxal 1:2 | 2.3 | 205 | 220 |
| 5 wt. % MEEH + Glyoxal 1:2 | 1.5 | 207 | 223 |
| 5 wt. % MEEH + Glyoxal 1:2 | 9.1 | 312 | 295 |
| 5 wt. % MEEH + Glyoxal 1:1 | 2.3 | 200 | 205 |
| 5 wt. % MEEH + Glyoxal 1:1 | 4.4 | 242 | 212 |
| 5 wt. % MEEH + Glyoxal 1:1 | 7.3 | 265 | 223 |
| 5 wt. % MEEH + Glyoxal 1:1 | 8.1 | 278 | 233 |
| 8 wt. % MEEH + Glyoxal 1:2 | 2.3 | 175 | 161 |
| 8 wt. % MEEH + Glyoxal 1:1 | 2.4 | 205 | 220 |
| 5 wt. % MEEH + GAL 1:2 | 2.3 | 259 | 262 |
| 5 wt. % MEEH + GAL 1:2 | 1.5 | 209 | 217 |
| 10 wt. % MEEH, 1.9 wt. % ACR 1:0.7 | 2.3 | 126 | 119 |
| 10 wt. % MEEH, 2.8 wt. % ACR 1:1.0 | 2.3 | 130 | 117 |
| 10 wt. % MEEH, 4.2 wt. % ACR 1:1.5 | 2.4 | 174 | 129 |
| 5 wt. % MEEH, 5.5 wt. % DEOPMA 1:1 | 2.3 | 145 | 141 |
| Invented dispersion with allyl-functional ethylene urea derivative (ALEH, commercial product Sipomer ® WAM, Alcolac) 5 wt. % ALEH + Glyoxal 1:1 | 2.4 | 335 | 351 |

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An aqueous binder composition, comprising:
   (A) a film-forming aqueous plastic dispersion; and
   (B) a crosslinking component,
   wherein said plastic dispersion (A) comprises an emulsion polymer with polymerized units of an ethylenically-unsaturated, radically polymerizable monomer with an alkylene urea side group, and
   wherein said crosslinking component (B) contains at least two protected or unprotected aldehyde groups.

2. The aqueous binder as claimed in claim 1, wherein said protected aldehyde groups are present in the form of an acetal, mercaptal or mercaptole group.

3. The aqueous binder as claimed in claim 1, wherein said emulsion polymer comprises 1 to 20 wt. % of said polymerized units of an ethylenically-unsaturated, radically polymerizable monomer with an alkylene urea side group.

4. The aqueous binder as claimed in claim 1, wherein said emulsion polymer comprises polymerized units of N-(2-acryloyloxyethyl)- or (2methacryloyloxyethyl)-ethylene urea.

5. The aqueous binder as claimed in claim 1, wherein said crosslinking component is water-soluble at least to a concentration of 0.2 mole/liter.

6. The aqueous binder as claimed in claim 5, wherein said crosslinking component is an aliphatic dialdehyde with the formula $OCH-(CH_2)_n-CHO$, wherein n is an integer of from 0 to 8.

7. The aqueous binder as claimed in claim 1, wherein said crosslinking component is a polymer of an ethylene-unsaturated, radically polymerizable monomer with a protected or unprotected aldehyde group.

8. The aqueous binder as claimed in claim 7, wherein said crosslinking component is a polymer with a weight average molecular weight from 1,000 to 500,000.

9. The aqueous binder of claim 1, further comprising a filler or a pigment.

10. An aqueous binder, comprising a self-crosslinking, film-forming, aqueous plastic dispersion, wherein said plastic dispersion comprises an emulsion polymer having polymerized units of an ethylenically-unsaturated, radically polymerizable monomer with an alkylene urea side group and polymerized units of an ethylenically-unsaturated, radically polymerizable monomer with at least one protected or unprotected aldehyde group and is dihydrazide-free.

11. The aqueous binder as claimed in claim 10, wherein said protected aldehyde groups are present in the form of an acetal, mercaptal or mercaptole group.

12. The aqueous binder as claimed in claim 10, wherein said emulsion polymer comprises 1 to 20 wt. % of said polymerized units of an ethylenically-unsaturated, radically polymerizable monomer with an alkylene urea side group.

13. The aqueous binder as claimed in claim 10, wherein said emulsion polymer comprises polymerized units of N-(2-acryloyloxyethyl)- or (2methacryloyloxyethyl)-ethylene urea.

14. The aqueous binder of claim 10, further comprising a filler or a pigment.

* * * * *